(12) United States Patent
Reiss et al.

(10) Patent No.: US 10,827,595 B2
(45) Date of Patent: Nov. 3, 2020

(54) SYSTEM, APPARATUS AND METHOD FOR WIRELESS TRANSMISSION OF CONTROL DATA

(71) Applicant: CHAUVET & SONS, LLC, Sunrise, FL (US)

(72) Inventors: Allan Reiss, Sunrise, FL (US); Raglan Jones, Sunrise, FL (US); Toby Freeman, Nottingham (GB)

(73) Assignee: CHAUVET & SONS, LLC, Sunrise, FL (US)

(*) Notice: Subject to any disclaimer, the term of this patent is extended or adjusted under 35 U.S.C. 154(b) by 0 days.

(21) Appl. No.: 16/251,967

(22) Filed: Jan. 18, 2019

(65) Prior Publication Data
US 2019/0230772 A1    Jul. 25, 2019

Related U.S. Application Data

(60) Provisional application No. 62/620,165, filed on Jan. 22, 2018.

(51) Int. Cl.
*H05B 47/19* (2020.01)
*H05B 45/20* (2020.01)
*H04L 12/28* (2006.01)

(52) U.S. Cl.
CPC ......... *H05B 47/19* (2020.01); *H04L 12/2827* (2013.01); *H05B 45/20* (2020.01); *H04L 12/2823* (2013.01)

(58) Field of Classification Search
CPC ............... H05B 37/0272; H05B 33/0863; H05B 35/00; H05B 37/02; H05B 37/0218; H05B 37/0227; H05B 37/0281; G06F 1/26; G06F 3/04886; G06F 3/048; G06F 3/04847; G08C 17/02; G08C 2201/40; G08C 2201/93; H01R 31/065; H02J 3/14; H02J 4/00; H04B 3/54; H04L 12/2803; H04L 12/2807; H04L 12/2809; H04L 12/2816; H04L 12/282; H04L 12/2825; H04L 12/2829; H04L 12/283; H04L 12/2832;
(Continued)

(56) References Cited

U.S. PATENT DOCUMENTS 9,408,282 B1    8/2016  Springer
9,839,089 B1*  12/2017  Wang .................. H05B 33/0863
(Continued)

FOREIGN PATENT DOCUMENTS

CN      203632915 U      6/2014
CN      204377220 U      6/2015
WO   WO-2010079388 A1 *  7/2010  ......... H05B 37/0245

*Primary Examiner* — Renan Luque
(74) *Attorney, Agent, or Firm* — Laurence A. Greenberg; Werner H. Stemer; Ralph E. Locher

(57) ABSTRACT

A system, apparatus and method for transmission of control data is provided. Application software executed on a smart phone or other computing device communicates with lighting fixtures or other configurable devices to automatically detect and pair with the devices without requiring a user to go through a pairing process. Additionally, the application software automatically places the devices in groups to coordinate the operation of those devices without requiring any complicated programming effort by a user. Further, the application software instructs each group of devices to provide a particular output or result, which may be different from group to group.

25 Claims, 9 Drawing Sheets

(58) Field of Classification Search
CPC ............. H04L 12/2836; H04L 12/66; H04L 2012/2841; H04L 47/30; H04L 47/522; H04L 61/2514; H04L 61/3065; H04L 61/6081; H04L 67/104; H04L 67/125; H04L 67/141; H04L 69/24; H04L 12/2823; H04L 12/22; H04L 12/2818; H04L 41/12; H04L 2012/2849; H04M 1/0202; H04M 1/7253; H04M 1/72533; H04W 12/08; H04W 28/08; H04W 28/085; H04W 4/008; H04W 4/60; H04W 4/80; H04W 52/04; H04W 72/0446; H04W 72/1263; H04W 76/14; H04W 84/12; H04W 84/18; H04W 88/06; H04W 88/08; H04W 92/10

See application file for complete search history.

(56) References Cited

U.S. PATENT DOCUMENTS

| | | | |
|---|---|---|---|
| 10,143,053 B1* | 11/2018 | Wilson | H05B 47/125 |
| 2005/0231134 A1 | 10/2005 | Sid | |
| 2014/0117780 A1* | 5/2014 | Buchheim | G01D 4/006 |
| | | | 307/126 |
| 2014/0285095 A1 | 9/2014 | Chemel et al. | |
| 2015/0120000 A1 | 4/2015 | Coffey et al. | |
| 2015/0282282 A1* | 10/2015 | Breuer | H04M 1/72533 |
| | | | 315/152 |
| 2015/0373796 A1 | 12/2015 | Bahrehmand | |
| 2016/0267738 A1* | 9/2016 | Carstens | E05B 65/5246 |
| 2016/0338170 A1* | 11/2016 | Lebel | H05B 47/19 |
| 2017/0013663 A1 | 1/2017 | Bora et al. | |
| 2017/0055332 A1 | 2/2017 | Flach | |
| 2017/0343197 A1* | 11/2017 | Gammons | H05B 47/155 |
| 2018/0063926 A1* | 3/2018 | Alfier | H05B 47/16 |
| 2018/0114434 A1* | 4/2018 | Newman, Jr. | H05B 47/19 |
| 2018/0302970 A1* | 10/2018 | Chen | H05B 33/0845 |
| 2018/0324932 A1* | 11/2018 | Yotsumoto | G06F 13/00 |
| 2019/0110351 A1* | 4/2019 | Rossi | H05B 37/0272 |
| 2020/0021456 A1 | 1/2020 | Wu | G06F 3/048 |

\* cited by examiner

SYSTEM, APPARATUS AND METHOD FOR WIRELESS TRANSMISSION OF CONTROL DATA

CROSS-REFERENCE TO RELATED APPLICATIONS

The present application claims benefit of Provisional Patent Application No. 62/620,165, filed on Jan. 22, 2018, entitled SYSTEM, APPARATUS AND METHOD FOR WIRELESS TRANSMISSION OF CONTROL DATA, that application being incorporated herein, by reference, in its entirety.

BACKGROUND OF THE INVENTION

1. Field of the Invention

The present invention relates to digital communication and control and, more particularly, to a system, apparatus and method for wireless transmission of data signals.

2. Description of the Related Art

The use of lighting and other effects for events and venues has increased greatly over recent years. Today, most events, such as concerts, theatrical shows, trade shows, corporate events, weddings and other parties and events, use lighting and other effects in some manner to supplement the main function of the event and enhance the event attendee's experience. The lighting and effects equipment are, typically, either programmed directly on the equipment or controlled from one or more control devices through the use of a data control protocol.

DMX (digital multiplexing protocol) is a standard data control protocol for digital communication commonly used to control lighting and theatrical effect equipment. DMX allows the operator to control, among other things, the movement, intensity and color of lights, and the operation of atmospheric equipment, such as fog machines.

However, DMX has certain limitations that adversely impacts its effectiveness and commercial viability. For instance, the use of DMX to control equipment requires control hardware to send the DMX signals, either via cables or wirelessly, to the equipment. The control hardware adds additional cost and requires the user to transport the hardware to the event.

In addition, the use of DMX to control lighting and other equipment requires complicated programming and the need for the user to learn how the DMX protocol works and how to program using DMX. For the casual, unsophisticated user of entertainment lighting and other equipment, the need to study and learn the DMX protocol and to take the time to develop programs for each event and venue, prevents many users of entertainment lighting fixtures and other equipment from ever using DMX. For example, bands performing in restaurants, bars and clubs may not use lights as part of their shows due to the need to purchase and transport a DMX controller and cables, and run data cables to each light fixture, and the complexities of programming the lights via DMX for each venue.

Accordingly, there is a need in the art for a new and improved system, apparatus and method for easily controlling light fixtures and other equipment. Any such system, apparatus and method should be capable of readily detecting the equipment to be controlled. Any such system, apparatus and method should be further capable of creating a coordinated show with the lights and other equipment without the need for any DMX knowledge, DMX controller or DMX programming by the user.

BRIEF SUMMARY OF THE INVENTION

The present invention is particularly suited to overcome those problems that remain in the art in a manner not previously known or contemplated. It is accordingly an object of the invention to provide a device, system and method for wireless transmission of control data that satisfies the needs of the prior art. In one particular embodiment of the invention, a plurality of wireless-enabled devices are automatically discovered by, and paired with, a wireless-enabled smart device, such as a smartphone or other wireless-enabled computing device, for the wireless transmission of control data from the smart device to the plurality of wireless-enabled devices. In one particular embodiment of the invention, the plurality of wireless-enabled devices are BLUETOOTH™ enabled lighting fixtures.

In another embodiment of the invention, a software application stored in non-transitory memory of a wireless-enabled smart device, and executed by a hardware processor of the wireless-enabled smart device, automatically discovers, and pairs with a plurality of wireless-enabled devices. In another particular embodiment of the invention, the software application is used to assign the plurality of wireless-enabled devices to a plurality of groups. In one embodiment of the invention, the software application is used to provide control signals to the wireless-enabled devices in a group, for example, to send the same control data to the devices in a particular group, which control data may be the same as, or different from, control data sent to the devices in a different group. The control data controls one or more parameters of the devices, such as intensity or color, to create coordinated effects.

In a further particular embodiment of the invention, the software application is executed by a processor of a BLUETOOTH™ enabled smart device to automatically, discover and pair with a plurality of BLUETOOTH™ enabled lighting fixtures. In one embodiment, the software application additionally automatically assigns the paired plurality of BLUETOOTH™ enabled lighting fixtures into a plurality of groups. In the present embodiment, the software application also wirelessly provides control data to the lighting fixtures of each group.

In another embodiment of the invention, the smart device wirelessly provides control data to wireless-enabled devices assigned to a group, at least one of which is connected by a cable or wire to a non-wireless enabled device. In this embodiment, the at least one wireless-enabled device acts as a master device to the non-wireless device, configured as a slave device, wherein the master device provides the wirelessly received control data from the smart device to the non-wireless slave device over the cable or wire.

Although the invention is illustrated and described herein as embodied in a system, apparatus for wireless transmission of control data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

It is accordingly an object of the invention to provide an apparatus, system and method for controlling light fixtures and other equipment and creating a coordinated show with lights and other effect equipment without the need for any programming knowledge by the user. For purposes of describing the embodiments below, lighting equipment will be referenced, but it should be appreciated that the invention could be used to pair with, and group, other equipment in the same manner.

In one particular embodiment of the invention, the BLUETOOTH™ functionality on a smart device, such as a smartphone, tablet, laptop or other computing device, is used to communicate with and control the BLUETOOTH™ enabled lights and/or lighting fixtures. However, it should be appreciated that any other communication control protocol now known or later developed can be used instead of BLUETOOTH™ within the scope and spirit of the invention, without the invention being limited only to BLUETOOTH™. For example, the lighting fixtures could be discoverable and communicated with over WiFi, or by IR, or another communication protocol, as desired, and would correspondingly include a communication module for that type of protocol instead of one for BLUETOOTH™ communication, as described herein. But, for exemplary purposes, and for purposes of describing one particularly preferred embodiment of the invention, the use of BLUETOOTH™ communication between wireless-enabled devices will be described herein.

Figure 1:
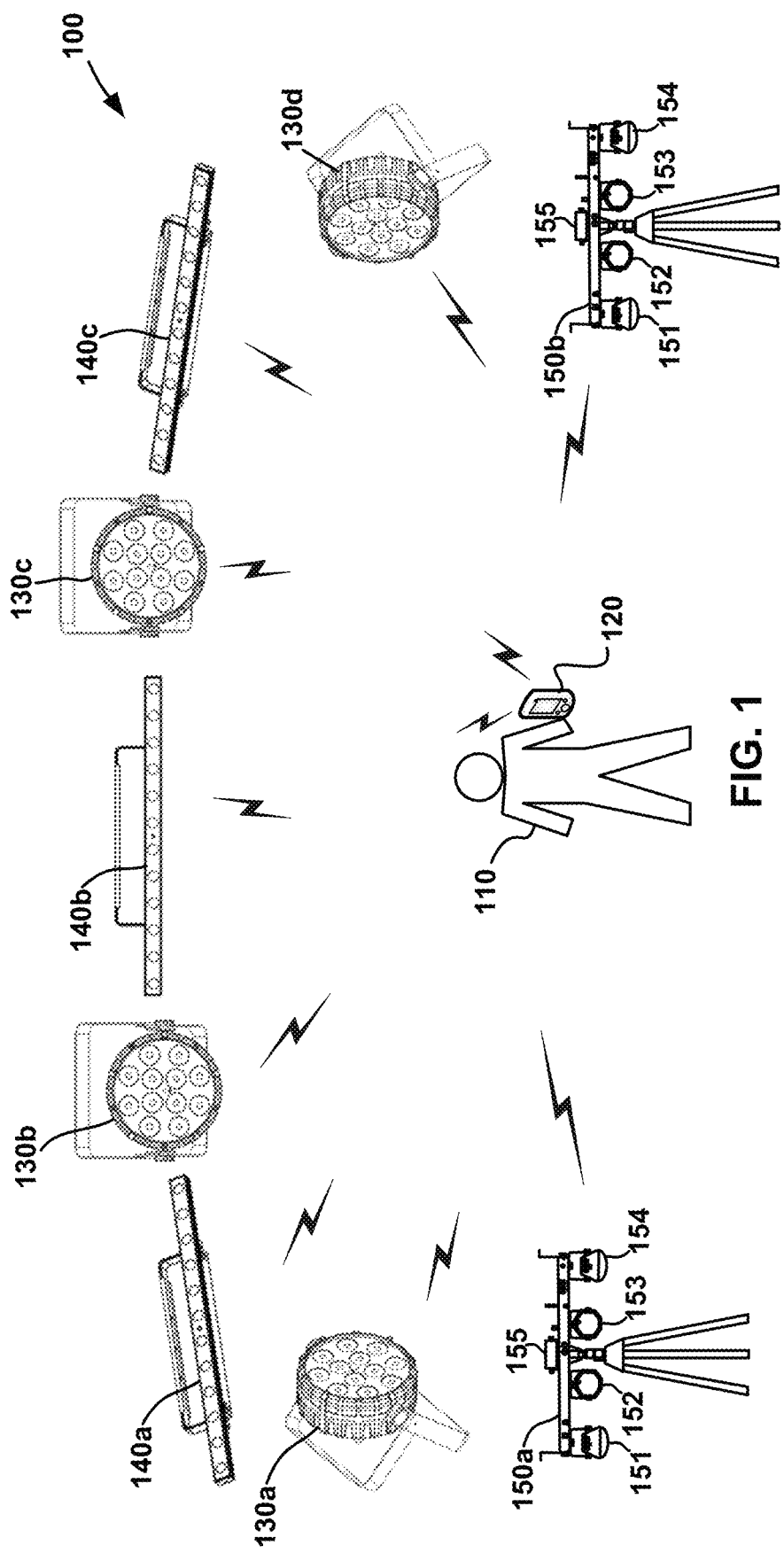
FIG. 1 is a simplified block diagram of a system in accordance with one particular embodiment of the invention.

Referring now to FIG. 1, there is illustrated one particular embodiment of the invention, wherein different parameters of a plurality of light fixtures 130a 130d, 140a 140c, 150a, 150b are controlled by application software (hereafter the "App") using a wireless protocol to produce lighting for a stage show. In the present preferred embodiment, the wireless protocol is the BLUETOOTH™ wireless protocol. First, the App is downloaded by the user 110 onto a smart device 120, such as a smartphone, tablet, laptop or other computing device. The App is stored in non-transitory memory of the smart device 120 and executed by a processor of the smart device 120. The App is configured to transmit control data to lights in use at a particular event, to cause the lights to perform a coordinated show. For purposes of the present description, the terms "control data" and "control signals" are used interchangeably herein. Additionally, the terms "light", "light fixture" and "lighting fixture", in the singular or plural, are used interchangeably herein, except where indicated to the contrary. In one particular embodiment of the invention, the lighting fixtures are used to provide stage lighting and/or theatrical light effects.

Figure 2:
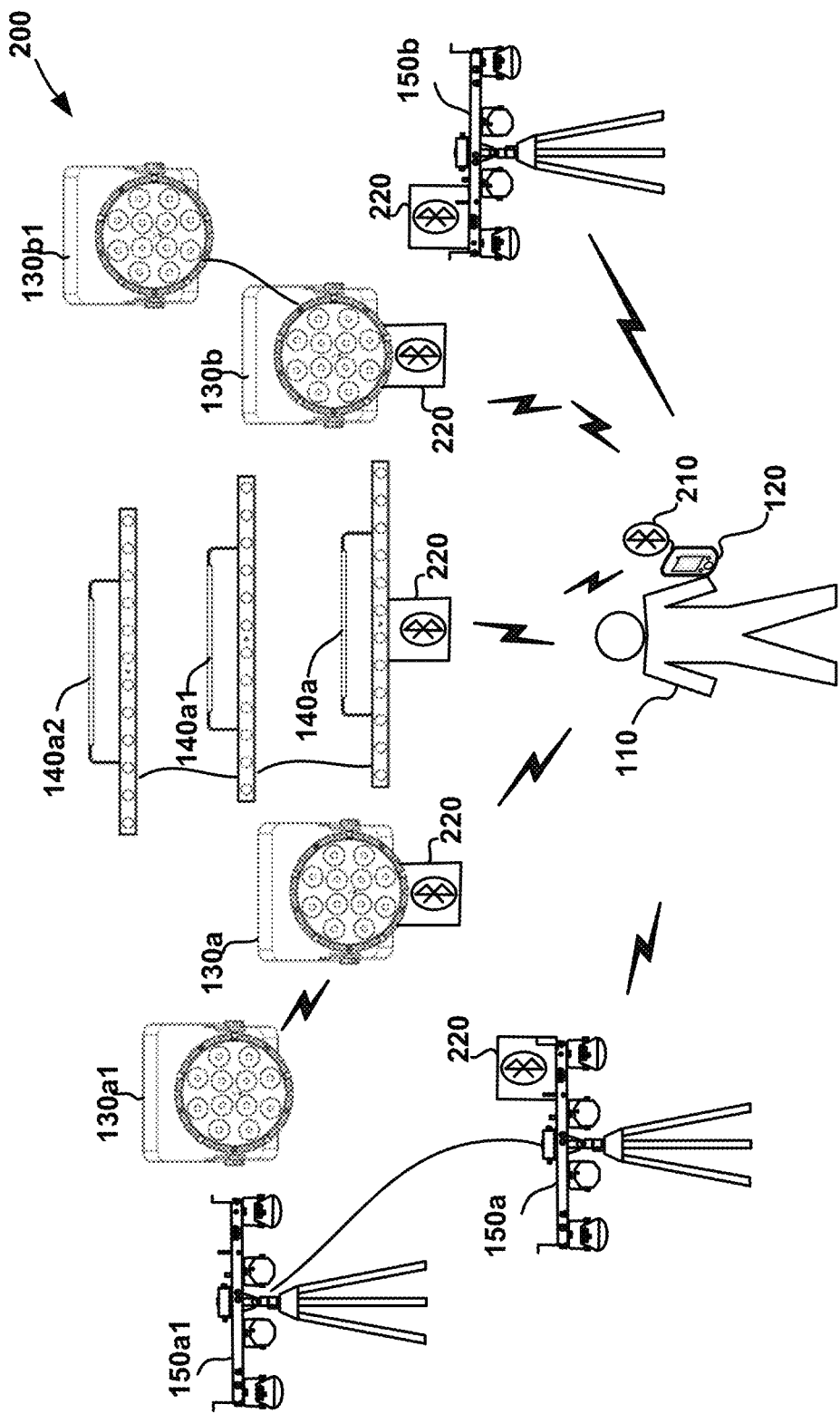
FIG. 2 is a simplified block diagram of a system in accordance with another particular embodiment of the invention.

In one particular embodiment of the invention, the App can work with the APPLE™ iOS® and ANDROID™ operating systems, or another operating system, as desired, to wirelessly configure and/or operate a plurality of BLUETOOTH™ enabled devices, without the need for additional hardware or knowledge of DMX programming. Each BLUETOOTH™ enabled device of the present invention includes its own BLUETOOTH™ module (220 of FIG. 2). For example, present smart devices 120 include BLUETOOTH™ communication circuitry and programming. Additionally, each of the lighting fixtures 130a-130d, 140a-140c, 150a, 150b includes an internal BLUETOOTH™ module comprising hardware and software and/or firmware built therein, for communicating wirelessly with the smart device 120 using the BLUETOOTH™ protocol. In one particular embodiment, each internal BLUETOOTH™ module is individually discoverable by other BLUETOOTH™ enabled devices and is programmed with its type of fixture and a unique fixture identifier used when being discovered.

Additionally, the BLUETOOTH™ module of each light 130a-130d, 140a-140c, 150a, 150b can be configured for both receiving BLUETOOTH™ signals from, and transmitting BLUETOOTH™ signals to, the BLUETOOTH™ enabled smart device 120. The App is structured to automatically detect, and pair with, the BLUETOOTH™ enabled lights 130a-130d, 140a-140c, 150a, 150b and to display the status and parameters of the paired lights and other equipment on the smart device 120. In one particular embodiment of the invention, the App automatically detects and pairs with the lights 130a-130d, 140a-140c, 150a, 150b, without requiring a user to manually pair the devices 120, 130a-130d, 140a-140c, 150a, 150b.

The App is further configured to assign the paired lights 130a-130d, 140a-140c, 150a, 150b into groups, so that each light within a group is controlled to have the same parameters or perform the same effects as the other lights in that group. Additionally, the App is configured so that each group of lights can have different parameters or perform different effects from the other groups at a particular time. For example, lights in one group can emit a red color while lights in another group emit a blue color and lights in yet another group perform a strobe effect. Alternatively, light can be emitted by each separate group at different times or in sequence to create a chase effect. The foregoing examples are not meant to be limiting, as it can be seen that alternative ways in which the grouped lights operate and emit light in relation to one another is endless. It is simply a function of how many different alternative programs are programmed into the App. In one particular embodiment of the invention, the App is configured to automatically assign the paired fixtures 130a-130d, 140a-140c, 150a, 150b into groups to create coordinated light shows without any specialized programming effort being required by the user. In one particular example, the App uses the fixture type and/or the identifier for the fixture to assign it to a group. Further, in one particular embodiment of the invention, the App provides control data to each lighting fixture over the wireless BLUETOOTH™ interface, to control the output of each assigned group of lighting fixtures. The transmitted control data is used to control different lighting parameters, including, but not limited to, the color, light intensity, sequences and effects (pulse, fade, speed, etc) output by each lighting fixture paired with the smart device 120.

By assigning the lights 130a-130d, 140a-140c, 150a, 150b into groups, the App development is simplified. For example, prior to the present invention, if a user desired to present a show using sixty-four light fixtures, the App would need to send sixty-four separate control instructions, i.e., one for each of the sixty-four light fixtures. This would require extensive programming, logic and processing capabilities. However, with the present invention, by grouping those same sixty-four fixtures into, for example, eight groups, with each light fixture within a group performing the same effect at the same time as all the other light fixtures in that group, the work of the App, and correspondingly, its structure and programming, is greatly simplified and a more organized and coordinated-looking light show is presented to the viewer.

The number of groups available in the App and the number of lights that can be placed in each group can be varied. In one preferred embodiment, the App includes eight groups and each group can include up to eight light fixtures, so that the coordinated light show can comprise up to sixty-four light fixtures. However, it should be appreciated that any number of groups can be used with any number of light fixtures within each group. For example, more or fewer light fixtures than eight can be provided, as desired, and more or fewer groups than eight groups being assigned by the application software, as desired, without departing from the scope or spirit of the present invention.

The selection of light fixtures within each group can be based on any criteria. For example, all light fixtures of the same model can be grouped together or all light fixtures of the same type or style, such as wash lights or beam lights or strobe lights can be grouped together.

In one preferred embodiment, the App is structured to automatically detect, pair with, and group the BLUETOOTH™ light fixtures within the BLUETOOTH™ transmission range and to determine what each group will output (color(s), intensity, etc.) and in what sequence. In order for the App to be able to determine how to control the light fixtures, the lighting profiles for the different fixtures to be controlled are stored within the application software. The lighting profile identifies what parameters the fixture is capable of outputting, such as colors, dimming, auto programs, etc., and how to access and control each of those attributes within the fixture.

Alternatively, in one particular preferred embodiment of the present invention, the user can manually elect which light fixtures to pair or not pair with the smart device 120, which paired fixtures to place in each group and what each group will output (color(s), intensity, etc.) and in what sequence relative to the other groups. In other words, the user can have a completely automated, programmed light show without any effort or the user can create his or her own custom programmed show.

It should also be appreciated that multiple control protocols can be used together to control light fixtures. For example, referring now to the system 200 of FIG. 2, the App described above can be used to transmit control data, by BLUETOOTH™ communication, from an internal BLUETOOTH™ module 210 of the smart device 120 to the internal BLUETOOTH™ communication modules 220 of one or more light fixtures 130a, 130b, 140a, 150a, 150b. In turn, each of the BLUETOOTH™ controlled light fixtures 130a, 130b, 140a, 150a, 150b can act as a master device to control other slave light fixtures 130a1, 130b1, 140a1, 140a2, 150a1, via DMX or other protocols (wired or wirelessly) in a master-slave arrangement. As discussed above, internal communications modules 210, 220 can execute another type of communication protocol, instead of BLUETOOTH™, if desired, without departing from the scope or spirit of the present invention.

In this multiple protocol setup, the light fixture receiving the BLUETOOTH™ control data from the smart device 120 includes an output port or wireless transmission capability to send a DMX or other control protocol signal to one or more other slave light fixtures 130a1, 130b1, 140a1, 140a2, 150a1, to cause those other light fixtures to output the same lighting effects as the BLUETOOTH™ controlled light fixture 130a, 130b, 140a, 150a, 150b. For example, the smart device 120 communicates with the lighting fixture 130a using the wireless BLUETOOTH™ protocol, while the light fixture 130a acts as a master device and transmits control signals, such as DMX signals, to the slave light fixture 130a1 via a wireless protocol, such as WI-FI, or a wired protocol, to cause the slave device 130a1 to have the same output parameters as the master device 130a. Similarly, the smart device 120 communicates control data to the lighting fixture 140a, which communications control signals to the slave light fixtures 140a1, 140a2, via a wired, daisy-chain connection.

As discussed above, the App can be stored in a smart device 120, such as a mobile telephone or smartphone, a tablet, or in another type of computing device, and be executed by a processor thereof. The device executing the App additionally includes a communication device or circuitry for communicating with a communication device or circuitry of each light fixture, for example, by BLUETOOTH™, IR or other wireless communication protocol. In another embodiment of the invention, a wired protocol is used.

Additionally, in one embodiment, each light fixture includes an electronics module that receives control signals from the App and processes and executes those control signals. In another embodiment, systems exist in which a plurality of light fixtures are controlled by a single electronics module in a multi-function lighting system, as described in U.S. Pat. No. 10,094,542, that patent incorporated herein by reference. See also, for example, the 4BAR lighting product produced by CHAUVET® DJ.

Referring back to FIG. 1, multi-function lighting systems 150a, 150b, are provided that each include a plurality of light fixtures 151, 152, 153, 154 and 155, which are associated with a single processor and a single communications module. That single communications module communicates an identifier to the smart device 120 that informs the App that a single device (i.e., controlled by a single processor or controller and a single communications address) includes a plurality of different lighting fixtures and/or different types of lighting fixtures. The App executed by the smart device 120 will then provide control data that controls the multiple lighting fixtures of the multi-function lighting system.

For example, the App can do one or more of the following: 1) recognize each lighting fixture and provide control data specifically for each fixture of the multi-function lighting system; 2) recognize groups of different types of lighting fixtures and provide control data for each of the different groups (i.e., single control data for all strobe lights or laser lights of the fixture); and/or 3) provide control data that activates an autoprogram previously stored in the multi-function lighting system, to produce coordinated lighting effects using the different lighting fixtures. Additionally, when a plurality of such multi-lighting fixture systems are paired with the smart device 120, the App can coordinate the lighting parameters and effects across the different systems 150a, 150b, the same as with any other lighting fixtures paired thereto.

In one particular embodiment, the electronics module of the lighting fixture includes a processor for executing software that processes control signals received from the App and executing lighting functions corresponding to those control signals, if appropriate. The communications device or circuitry for each light fixture may be provided integral to the electronics module of each light fixture or, alternately, may be housed in a USB dongle (as illustrated in U.S. Pat. No. 10,019,893, incorporated herein by reference) or other external device that can be mated to the electronics circuitry of the light fixture.

In one particular embodiment of the invention, a graphical user interface (GUI) is used to interact with the App. In a preferred embodiment of the invention, the App can be used to pair with, and group together, the light fixtures, to control the operation of those fixtures as described herein, without the user needing to know or perform any particularized programming of the fixtures, in DMX or another programming system. In other words, the user does not need to know how to program with DMX to coordinate and control the light fixtures paired with the App. This present invention provides a pair-and-play lighting system that, thus, permits the quick setup and control of multiple light fixtures without requiring sophisticated knowledge of DMX programming. Rather, in a preferred embodiment of the invention, light fixtures having BLUETOOTH™ or other communications modules are powered on, the App is opened and executed on a smartphone, tablet or other computing device and the App and the system does the rest.

Figure 3:
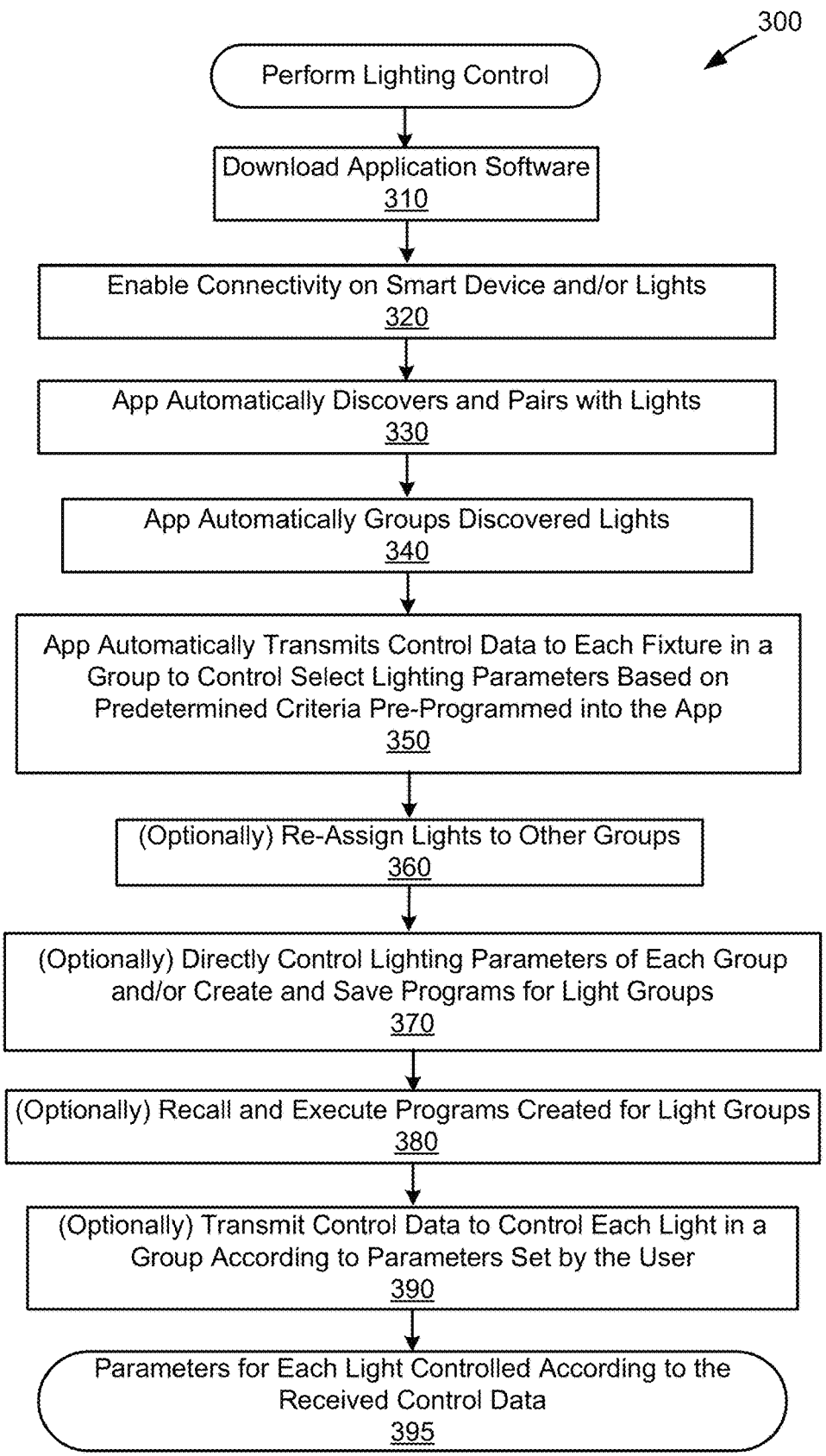
FIG. 3 is an exemplary flow diagram illustrating generally one particular method in accordance with one particular embodiment of the present invention.
Figure 4:
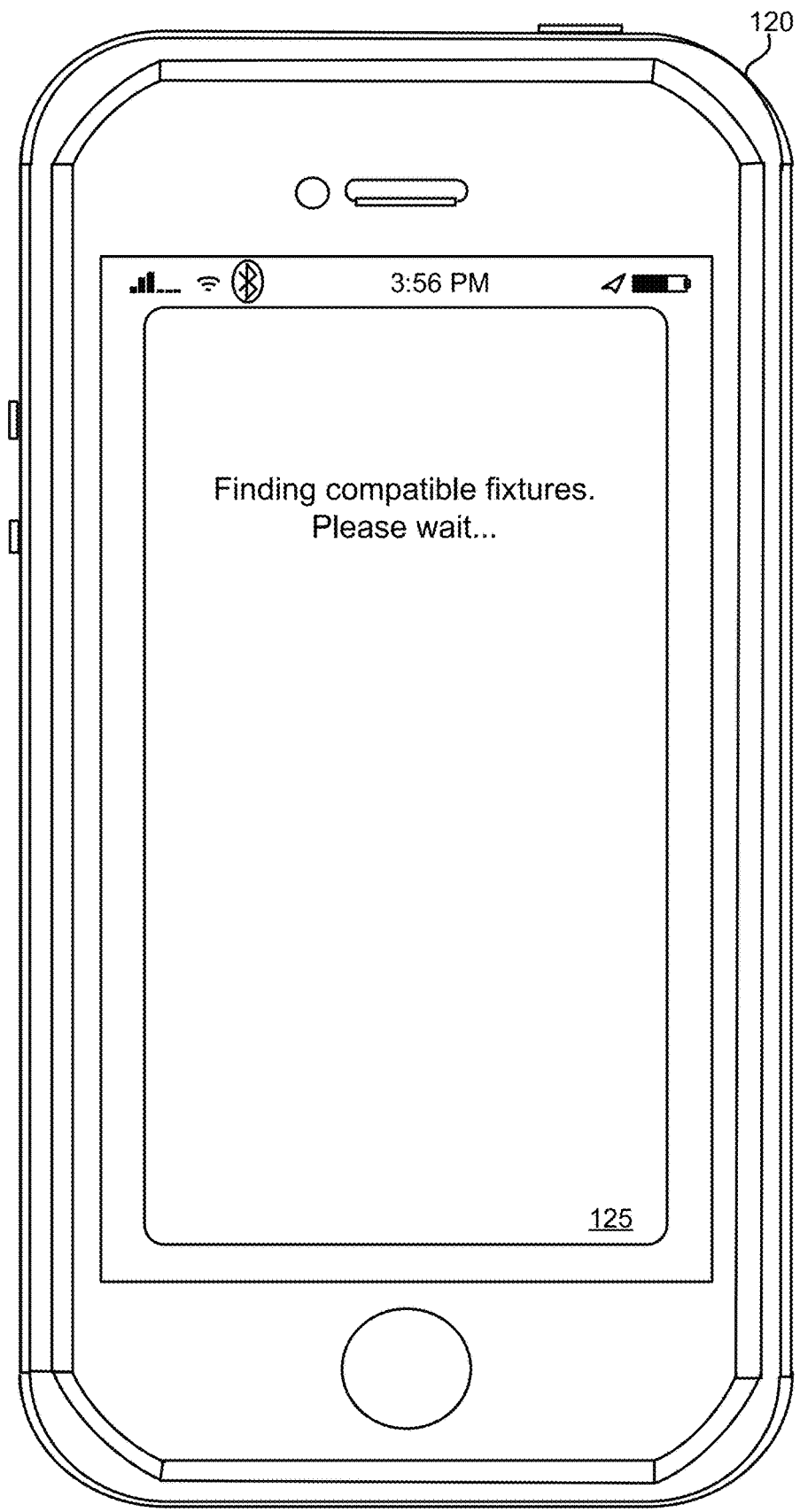
FIG. 4 is an illustration of one possible smart device executing application software useful with one embodiment of the present invention, the smart device performing a method step of one particular embodiment of the present invention.
Figure 4A:
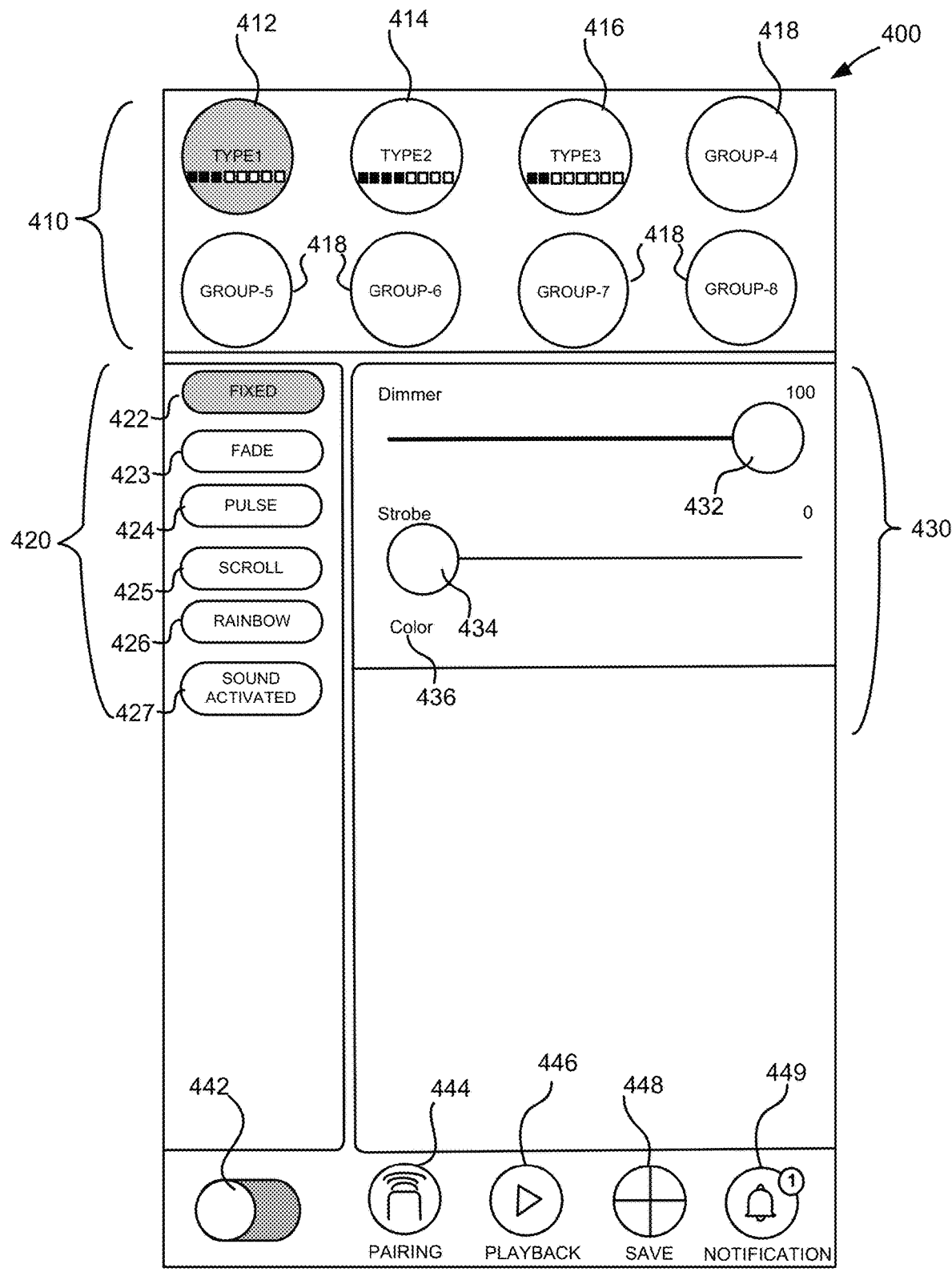
FIG. 4A is an illustration of a graphical user interface (GUI) used to program lighting fixtures using application software in accordance with one particular embodiment of the present invention.
Figure 4B:
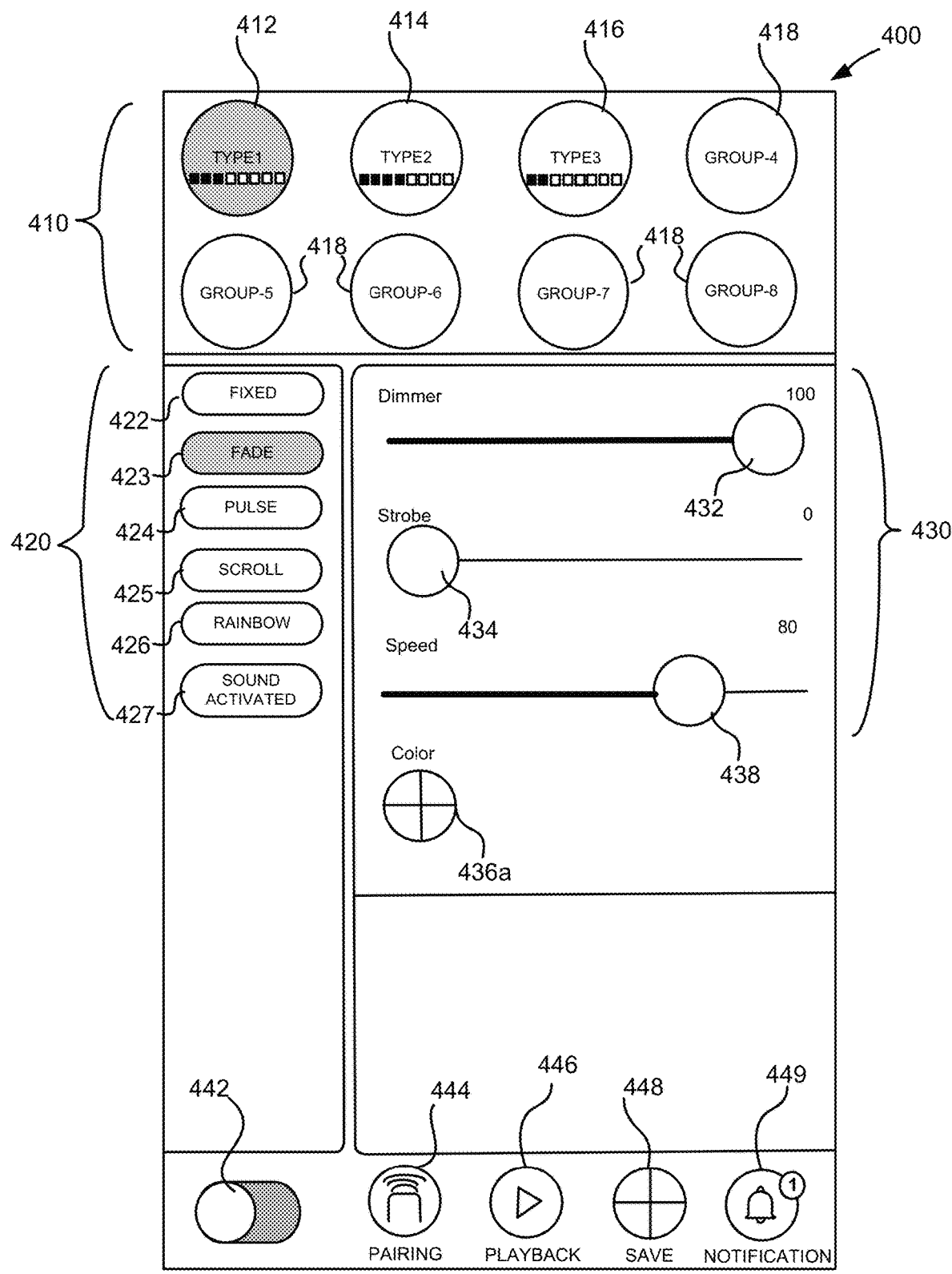
FIG. 4B is an illustration of another graphical user interface (GUI) used to program lighting fixtures using application software in accordance with one particular embodiment of the present invention.
Figure 4C:
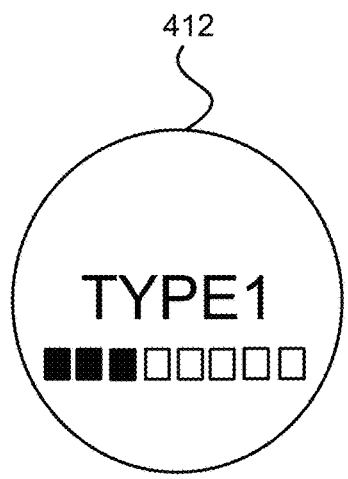
FIG. 4C is an enlarged illustration of an icon providing information regarding a group of lighting fixtures using application software in accordance with one particular embodiment of the invention.
Figure 4D:
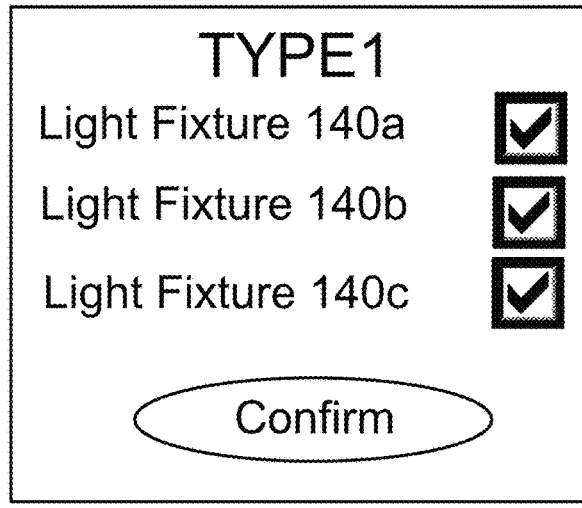
FIG. 4D is an illustration of a sub-menu of a graphical user interface for activating/deactivating lighting fixtures of a group using application software in accordance with one particular embodiment of the present invention.
Figure 4G:
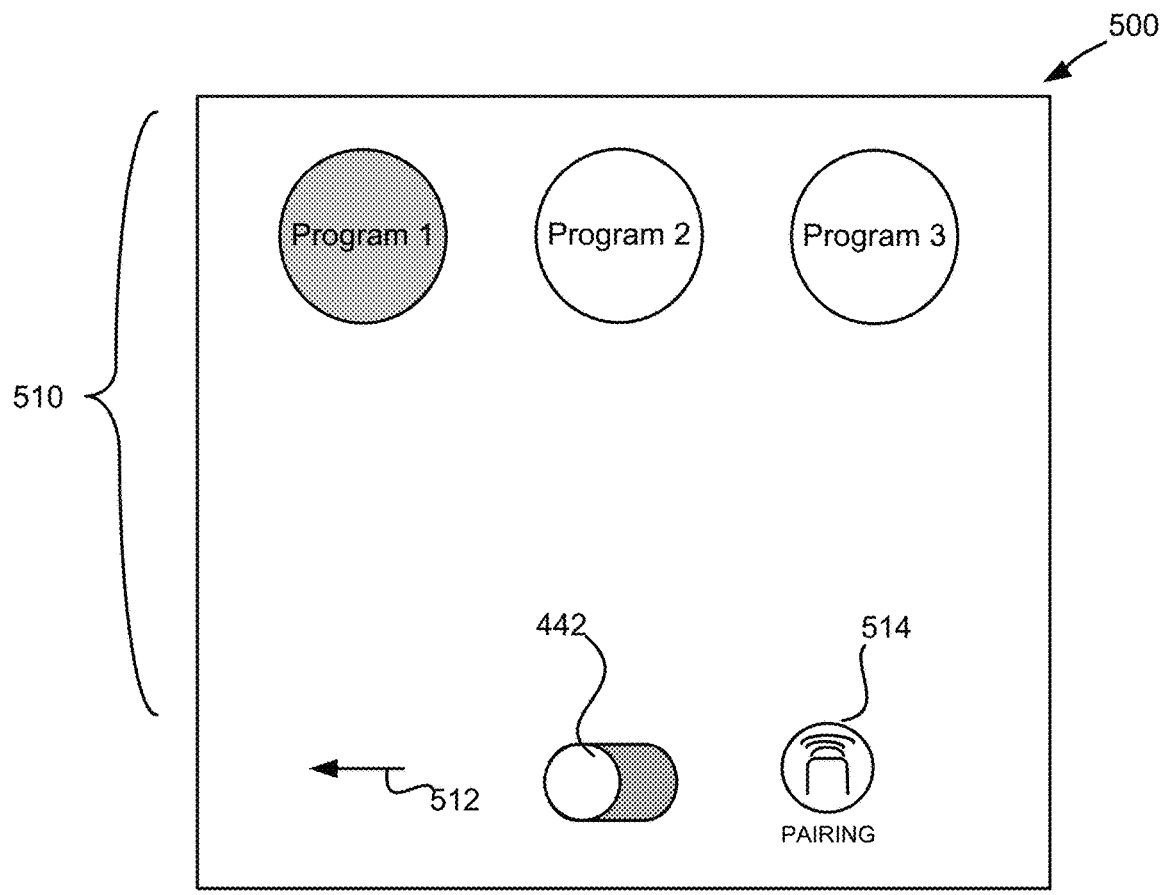
FIG. 4G is an illustration of a sub-menu of a graphical user interface for selecting a saved program for output by lighting fixtures of a group using application software in accordance with one particular embodiment of the present invention.

Referring now to FIGS. 3-4G, there will now be described a method 300 for performing lighting control in accordance with one particular embodiment of the invention. First, an App, as described above, is downloaded to the smart device 120. The App can be obtained directly from website, or via an intermediary digital distribution service, such as the APPLE® App Store or GOOGLE PLAY™ Store. Step 310. In order for the App to automatically pair with the lights, BLUETOOTH™ connectivity is enabled on the smart device before opening the App. Step 320. Additionally, all lights to be detected should be powered on at this time. In one particular embodiment of the invention, each lighting product having BLUETOOTH™ connectivity capabilities is made discoverable by selecting a BLUETOOTH™ connectivity setting using a user interface or menu of the lighting fixture. In another particular embodiment of the invention, each BLUETOOTH™ enabled light is rendered automatically discoverable by its firmware or software in the lighting fixture. In accordance with the present invention, a plurality of lights and/or lighting fixtures will be paired with and grouped, automatically, by the App. As discussed above, other types of communication protocol may be used instead of the BLUETOOTH™ protocol, without departing from the scope or spirit of the present invention.

More particularly, upon opening, the App directs the smart device 120 to automatically discover and pair with the discoverable lighting fixtures. Step 330. A pairing screen may be presented to the user while the App causes the smart device 120 to automatically discover and pair with the discoverable lighting fixtures. For example, a message may appear on a touch-sensitive display 125 of the device 120, such as, "Finding compatible fixtures. Please wait . . . " may be provided to the user during automatic pairing. See, in particular, FIG. 4.

Once the compatible lighting fixtures have been discovered and paired with the smart device, in accordance with the present embodiment, the App will automatically find and group compatible products. Step 340. For example, in one particular embodiment, like lighting fixtures will be assigned into common groups. The selection of light fixtures within each group can be based on any criteria. For example, all light fixtures of the same model can be grouped together or all light fixtures of the same type or style, such as wash lights or beam lights or strobe lights can be grouped together. Using FIG. 1 as an example, fixtures 130a-130d can be grouped into one group (TYPE1), while the fixtures 140a-140c are assigned to another group (TYPE2) and the fixtures 150a and 150b are assigned to a third group (TYPE3).

In the absence of the user manually sending control signals to each of the groups TYPE1, TYPE2, TYPE3, the App is pre-programmed to automatically send control signals to each group to cause each group to output predetermined parameters and do predetermined effects (i.e., a "show"). Step 350. More particularly, in one particular embodiment of the invention, the App will automatically transmit control data to each fixture in a group, to control select lighting parameters based on predetermined criteria pre-programmed into the App. The user can override the pre-programmed show, if desired, and design their own show using the App.

For example, after the App has assigned the discovered/paired fixtures into groups, the user can use the app to re-arrange the groups (Step 360) or to assign functions, characteristics and/or effects to the lighting fixtures in each group (Step 370). FIG. 4A illustrates one particular example of a program screen or GUI 400 produced by the App and displayed on a touch-sensitive display 125 of the smart device 120, that can be used to re-assign lights into groups 410, and to create and playback lighting programs including different types of effects 420, without the need for the user to understand the DMX protocol.

More particularly, GUI 400 permits the user to create and save in non-transitory memory of the smart device 120, programs of different types using taps or touches performed on the touch-sensitive display 125. For example, software in the App is configured to permit the creation of programs associated with each group 412-418 of lighting fixtures. In the present example illustrated, there are four types of programs available to control the parameters output by the lighting fixtures of a group, using the GUI 400: Static; Automatic; Chase; and Sound-Activated.

Static: The FIXED option 422 sets a static color 436, the dimmer level 432 and an optional strobe rate 434 of lighting fixtures of the selected group (in the present example of GUI 400, Group TYPE1 is illustrated as being selected using the soft button 412).

Automatic: These options allow automatic setting of a series of colors using add color icon 436*a* to follow one after another, and adjustment of the dimmer level 432, an optional strobe 434 and a program speed 438. The automatic functions include the program options FADE 423 and PULSE 424.

Chase: In a chase program, each produce in a group will be offset by one color from the previous product in the group, creating the effect of each color moving from product to product. These program options set a series of colors to follow one after another, the dimmer level, an optional strobe rate, and the program speed. The chase program options are SCROLL 425 and RAINBOW 426.

Sound Activated: The sound activated option 427 sets a series of colors to follow one after another, the dimmer level, and an optional strobe rate. The selected products will trigger color changes as they receive sound input. For example, in one particular embodiment of the invention, in a sound activated program, the linked products will only respond to low frequencies of music (i.e., bass and drums).

In one embodiment of the invention, a program is designed by first selecting the program type 420 using the soft buttons 422-427. Subsequently, values are selected (from 0-100) for a Dimmer level 432, strobe rate 434 and (for all but fixed and sound activated programs) the program speed 438. Then colors are added to the program.

In one particular embodiment of the invention, colors may be selected for a FIXED program 422, tapping the Color icon 436 will navigate to a color picker. For any program type other than FIXED program 422, tapping the Add Color to Program icon 436*a* will bring up a selection of preset colors. Tapping a preset color will add it to the color list of the program, placing it before the Add Color Icon 436*a*. To mix a custom color and add it to the program color list, a Custom Color icon can be provided that will navigate the user to a color picker. Custom colors can be added to, and deleted from, the preset color selection using different program screens and graphical user interfaces of the App.

A program can be saved to non-transitory memory of the smart device 120 by tapping the SAVE button 448 on the GUI 400. In one embodiment of the invention, a pop-up will appear in which a user can enter the desired name of the program and confirm saving of the program. Once saved, a program can be played back using PLAYBACK button 446, renamed or deleted, using different functions programmed into the software of the App.

More particularly, to play back a saved program, GUI 400 is used to select a group or groups that will run the desired program. For example, in FIG. 4A Group TYPE1 was selected by tapping soft button 412 on the touch-sensitive display 125. Each active group will be highlighted, as illustrated more particularly in FIG. 4A. Additionally, active products in each group are represented by a darkened dot in the group symbol 412, as illustrated more particularly in FIG. 4C. In one embodiment of the invention, individual products within a group can additionally be activated or deactived.

For example, referring now to FIGS. 1, 4C and 4D, to deactive or reactivate a specific product or products with a group, tap and hold the icon 412 of the selected group TYPE1 to bring up a sub-menu 450. All products in the selected group, TYPE1 in the presently illustrated example, will be listed with corresponding check-boxes. Un-checking a check box will deactivate the corresponding lighting fixture 140*a*, 140*b* or 140*c*. When all lighting fixtures are activated or deactivated, as desired, the user can tap the "Confirm" soft button to apply the settings. In one particular embodiment of the invention, a deactivated product will continue running the last instructions it received. Deactivating all products in a group will deactivate the group. In a further embodiment, deactivating a group and then reactivating it will reactivate all products in that group.

Figure 4E:
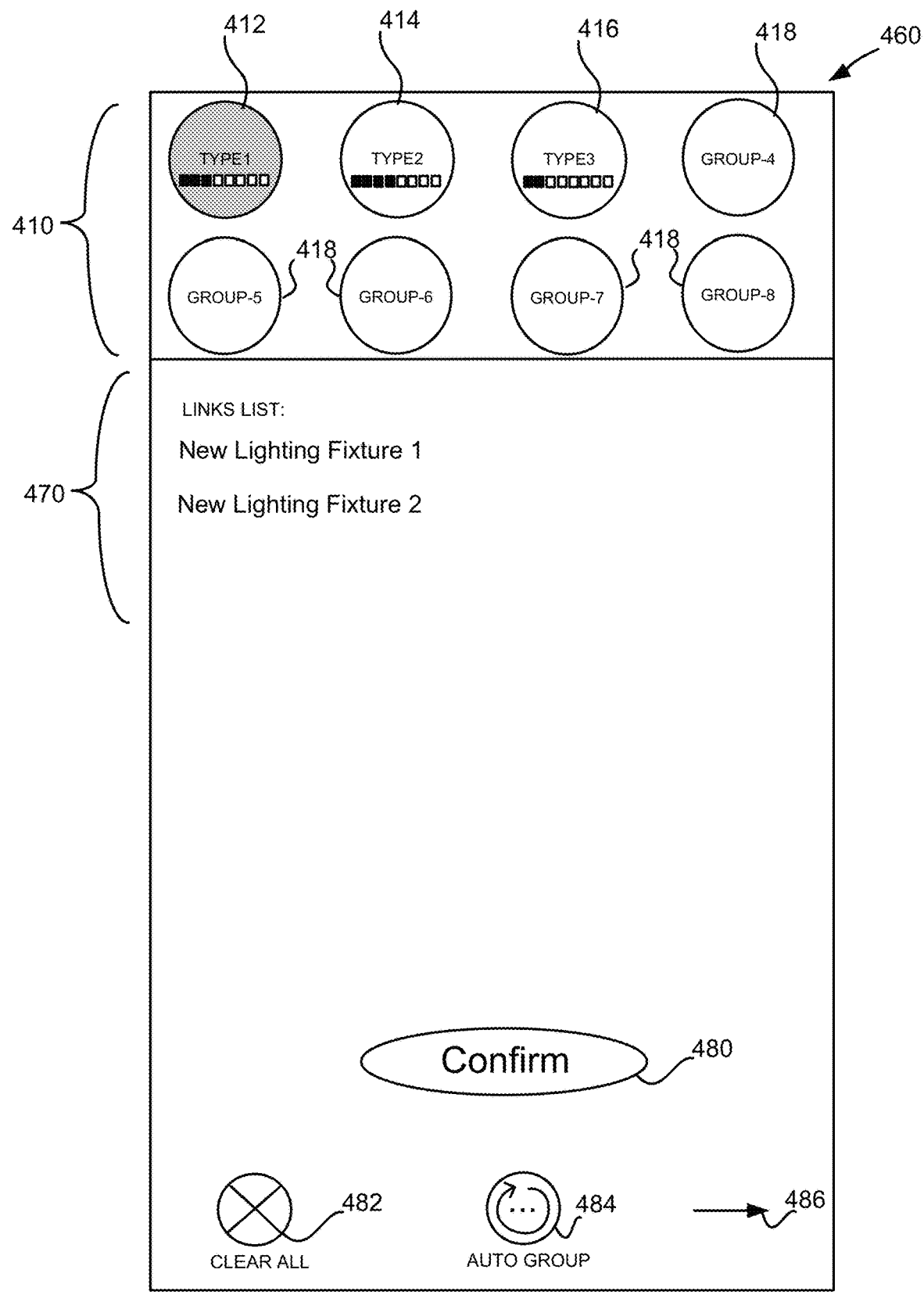
FIG. 4E is an illustration of a graphical user interface (GUI) used to assign lighting fixtures to a group using application software in accordance with one particular embodiment of the present invention.

Further, if desired, lighting fixtures can be manually assigned to groups and/or manually re-assigned from one group to another using graphical user interface screens of the App running on the smart device 120. Referring more particularly to FIGS. 1, 4A and 4E, to re-assign lights to other groups (Step 360), a user taps the PAIRING icon 444 on the GUI 400 and a further program screen or GUI 460 is provided.

In the GUI 460, un-grouped products are listed in the un-grouped products area 470. For example, two BLUETOOTH™ enabled devices—"New Lighting Fixture 1" and "New Lighting Fixture 2"—which were turned on and set to BLUETOOTH™ control mode, are illustrated as having been discovered but not grouped. The new lighting fixtures can be assigned to groups either by manually or automatically assigned to a group. More particularly, pressing the AUTO GROUP icon 484 on the touch-sensitive display 125 will reset all linked device and automatically assign them to groups according to the desired grouping criteria described elsewhere herein. Alternately, the new lighting fixtures can be manually assigned to a group by tapping the desired fixture in the LINKS LIST. In one particular embodiment of the invention, the selected fixture can be dragged over the desired group and dropped therein, by selecting and holding the fixture name, dragging it over a group icon 412-418 and, with the name held over the selected icon, removing the finger from the touch-sensitive display 125. In another embodiment of the invention, the user taps the name(s) of the desired fixture(s) in the LINKS LIST and then taps the Confirm button 480. This will bring up a further sub-menu displaying the available lighting fixture groups 412-418. Tapping the icon of the desired group 412-418 will send all selected lighting fixtures to that group. It should be noted that, in one particular embodiment of the invention, only lighting fixtures of the same type can be grouped together.

Also on the GUI 460, the CLEAR ALL icon 482 will un-group all lighting fixtures from their assigned groups and return them to the LINKS LIST. The Return icon 486 will return the user to the program GUI 400.

Figure 4F:
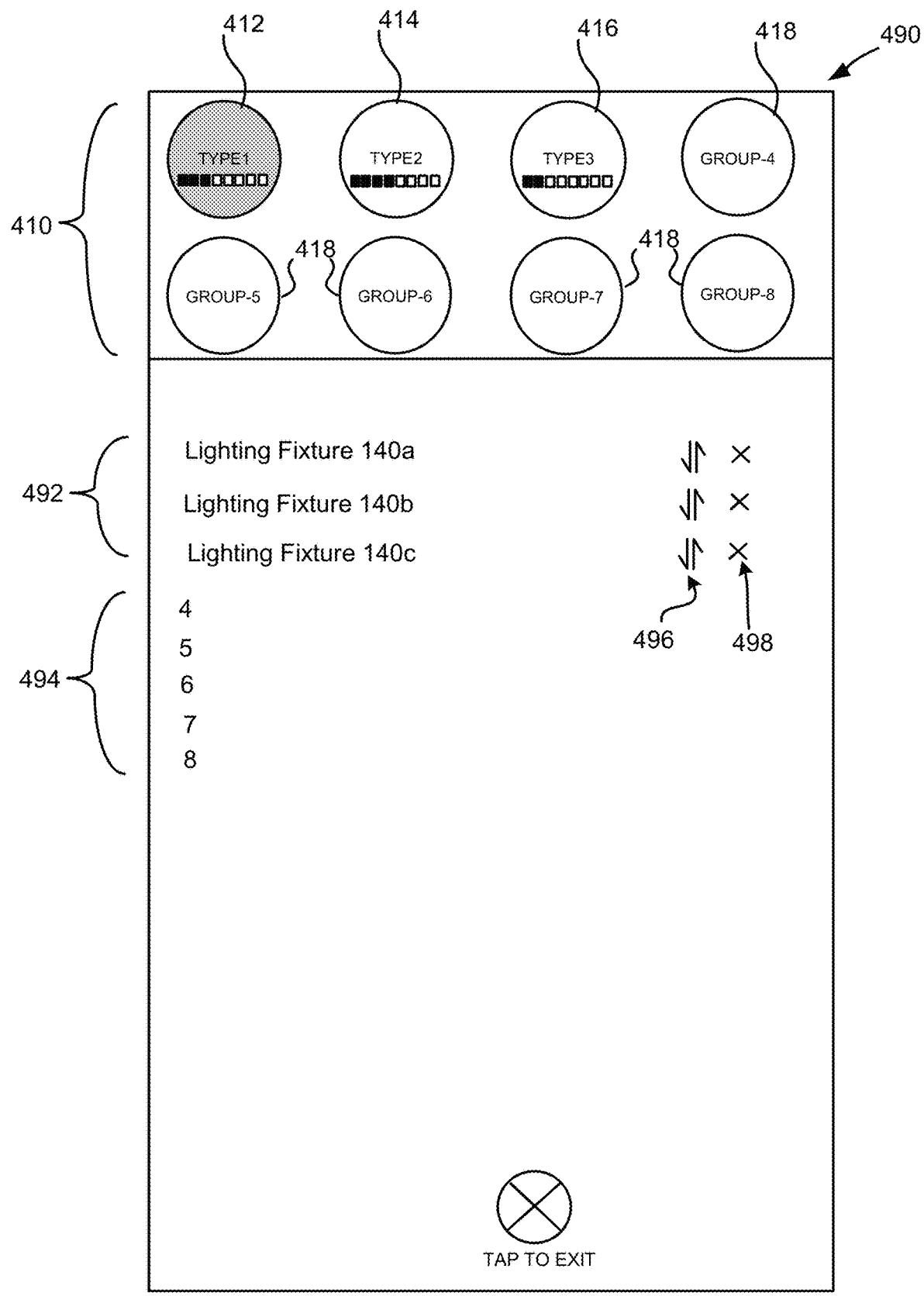
FIG. 4F is an illustration of another graphical user interface (GUI) used to re-organizing lighting fixtures assigned in a group using application software in accordance with one particular embodiment of the present invention.

Referring now to FIGS. 1, 4A and 4F, the lighting fixtures in a group can be organized, as desired. More particularly, selecting a particular group using a group icon 410 will bring up a further GUI 490, that allows the user to organize the selected group. For example, pressing the TYPE1 group icon 412 will bring up a GUI 490 illustrating the filled slots 492 containing the products 140*a*, 140*b*, 140*c*. Empty slots

494 are additionally illustrated. This GUI 490 can be used to move selected lighting fixture from one slot to another, by dragging and dropping, or by using the change order icon 496. In one embodiment of the invention, the change order icon 496 next to the desired product is tapped and slid up or down, as desired. The order of lighting fixtures in the group determines the playback order of the lighting fixtures in the chase mode.

To remove a product from the group, the X icon 498 next to the desired lighting fixture can be tapped. To send a lighting fixture to another group, the lighting fixture can be selected and drapped-and-dropped into the desired group by pulling the name of the lighting fixture over the desired group icon 412-418 and dropping it there. In an alternate embodiment of the invention, tapping a slot will bring up a further sub-menu listing the groups 410 and the user can then tap the desired group on the sub-menu to join the selected lighting fixture to that group.

Additionally, as illustrated in Step 380 of FIG. 3, the App of the present embodiment is configured to recall and execute programs created for light fixture groups. Referring now to FIGS. 1, 4A and 4G, to select a saved program to playback on all active groups, it is necessary to navigate to the playback GUI 500 by selecting the PLAYBACK icon 446 on the program GUI 400. The playback GUI 500 allows the user to select a previously stored program (i.e., Program 1) from a list of saved programs (i.e., Program 1, Program 2, Program 3). All active groups will run the selected program. In this way, rather than having to program each lighting fixture individually, a user can create programs and assign them to a group of like-type lighting fixtures with a few taps on a GUI.

The playback GUI 500, and/or a sub-menu thereof, can additionally be used to rename or delete the saved programs, as desired. The Return icon 512 will return the user to the program screen, when tapped. Similarly, the Pairing icon 514 will return a user to a pairing screen when tapped.

The program GUI 400 and the playback GUI 500 of the App each include a blackout toggle 442 that is used to toggle blackout for all active products. The blackout toggle 442 will, depending on its state, disable output for all active products or enable output for all active products. Only active groups and lighting fixtures will be affected by the blackout toggle 442. In one embodiment of the invention, a lighting fixture that is blacked out will stay blacked out if it is deactivated when the blackout toggle 442 is activated. In another embodiment of the invention, a lighting fixture that is not blacked out will not black out if it is deactivated when the blackout toggle 442 is activated.

Returning back to FIG. 3, after the lighting fixtures have been paired, grouped and programmed, the App of the present embodiment transmits control data to control each light fixture in a group, according to the parameters set by the user using the App. Step 390. In one particular embodiment of the invention, the control data is transmitted wirelessly to the lighting fixtures. In a particularly preferred embodiment of the invention, the control data is transmitted from the smart device 120 to the lighting fixtures using the BLUETOOTH™ wireless communication protocol. As discussed herein, other wireless transmission protocols can be used instead of the BLUETOOTH™ wireless communication protocol, and still remain within the scope and spirit of the present invention. The control data transmitted may be converted by the App to instructions that can be understood by the local processor controlling each light fixture. If desired, the control data can be translated by the App into DMX program instructions. In one particular embodiment of the invention, the App transmits control data to the lighting fixtures based on the addresses of the fixtures assigned to each group, and based on the program set for that group. In one embodiment, the control data transmitted includes instructions for actions to be taken by the lighting fixtures of each group, depending on the types of fixtures contained in each group. In another embodiment of the invention, the control data transmitted triggers an automated program stored locally in a lighting fixture.

Among other things, the control data is used to control different lighting parameters, including, but not limited to, the color, light intensity, sequences and effects (pulse, fade, speed, etc) output by each lighting fixture paired with the smart device 120. Step 395. In one embodiment of the invention, the control data includes a lighting program that is transmitted to a memory of each lighting fixture of a group, wherein each lighting fixture of the group executes the stored lighting program autonomously. If desired, the application software can be configured to communicate a stored lighting program to an external device to be stored, accessed and used by application software in lighting systems of other users. For example, programs created by the App can be uploaded to storage and shared with other App users. Additionally, as described herein, the control signals received by paired lighting fixtures can be used to control slave devices connected to the paired devices by another type of wired or wireless connection.

The App of the present embodiment of the invention can additionally be configured in software to have other features beneficial to the user of the smart device 120, upon which the App is being executed. For example, in one embodiment of the invention, the App is programmed by software to facilitate push notifications being sent to the user of the smart device 120 via a different communication device or communication channel. In one particular example, promotional messages about new products or features can be communicated to App users through the App. In this embodiment, the App has a notification icon 449 that provides an indication to the user that a message has been received. The user can view the message by pressing the notification icon 449.

In another example, the App has an icon that can be pressed for special downloads to be provided to the user. The user can then enter an email address, phone number and/or name to communicate information through the App to the App developer, who can then send additional information to the user via another communication device or communication channel, for example, via email, text or SMS message, download, etc. The App can be configured by software to have other features of benefit to the user.

In another embodiment of the invention, an external switch is provided that is configured to activate programs stored in the App. For example, a footswitch having BLUETOOTH™ communication circuitry can send a communication signal to the smart device to change colors, trigger stored programs, stop the effect currently running and/or control any other function of the App, upon the user depressing one or more switches on the footswitch.

A number of types of lighting fixtures currently in existence and/or later produced to include compatible communications modules can be used in accordance with the present invention. Example of lighting fixtures that may be used with the present invention include, but are not limited to, the EZLink Par Q6 BT, EZLink Par Q4 BT, EZLink Strip Par Q6 BT, EZLink FS BT, 4 Bar LT Quad BT, SlimPAR T12 BT, SlimPAR Q12 BT and COLORband T3 BT all by CHAUVET® DJ.

Although the invention is illustrated and described herein as embodied in a system, apparatus and method for wireless transmission of control data, it is nevertheless not intended to be limited to the details shown, since various modifications and structural changes may be made therein without departing from the spirit of the invention and within the scope and range of equivalents of the claims.

We claim:

1. A lighting system, comprising:
a plurality of system compatible lighting fixtures, each lighting fixture including a first wireless communication device configured to receive control data structured to adjust at least one of a plurality of lighting parameters of the system compatible lighting fixtures;
a portable computing device including a processor, a user interface and a second wireless communication device; and
application software stored in memory of the portable computing device and executable by said processor, said application software including lighting profiles for all system compatible lighting fixtures, said application software configured to automatically detect all first wireless communication devices of system compatible lighting fixtures in one step and to automatically pair the second wireless communication device with said all first wireless communication devices without requiring a user to manually pair said second wireless communication device with said first wireless communication devices, to communicate first control signals directly to each first wireless communication device.

2. The lighting system according to claim 1, wherein each wireless communication device is a radio communication device.

3. The lighting system of claim 2, wherein the wireless radio communication device is a Bluetooth transceiver.

4. The lighting system of claim 1, wherein, at least one of said plurality of system compatible lighting fixtures is connected as a master device to another system compatible lighting fixture in a master-slave configuration, said master device providing second control signals to said another system compatible lighting fixture based on said first control signals communicated to the first wireless communication device of said master device.

5. The lighting system of claim 4, wherein the master device is connected to the another system compatible lighting fixture via a wired connection.

6. The lighting system of claim 4, wherein said second control signals are communicated to said another system compatible lighting fixture using a different communication protocol than is used to communicate said first control signals to said first wireless communication device.

7. The lighting system according to claim 1, wherein said application software executed by the processor is configured to automatically assign a system compatible lighting fixture associated with each first wireless communication device to a group based on predetermined grouping criteria preprogrammed in said application software.

8. The lighting system according to claim 7, wherein said application software automatically determines lighting parameters to be output by the system compatible lighting fixtures of each group based on predetermined criteria preprogrammed in said application software.

9. The lighting system of claim 7, wherein said application software automatically determines a plurality of lighting parameters to be output by the system compatible lighting fixtures of each group in a continuous predetermined sequence to create a light show based on predetermined criteria preprogrammed in said application software.

10. The lighting system according to claim 9, wherein said portable computing device includes a graphical user interface to control select lighting parameters of each system compatible lighting fixture of a group.

11. The lighting system according to claim 9, wherein said user interface of said portable computing device includes a graphical user interface structured to add and remove at least one of said system compatible lighting fixtures from a group to which it was automatically assigned and/or add at least one of said system compatible lighting fixtures to a group to which it was not automatically assigned.

12. The lighting system according to claim 11, wherein said graphical user interface of said portable computing device is further structured to modify said plurality of lighting parameters automatically determined by said application software to be output by each lighting fixture of a group and the portable computing device is configured to transmit control signals corresponding to said lighting parameters to each system compatible lighting fixture in said group.

13. The lighting system according to claim 12, wherein said application software groups said sequence of lighting parameters into a lighting program to be transmitted to a memory of each system compatible lighting fixture of a group, wherein each lighting fixture of the group executes the stored lighting program autonomously.

14. The lighting system according to claim 13, wherein said application software is configured to communicate the stored lighting program to an external device to be stored, accessed and used by application software in lighting systems of other users.

15. The lighting system of claim 9, wherein said sequence of lighting parameters output by each group is different than said sequence of lighting parameters output by each other group.

16. The lighting system according to claim 1, wherein said application software is configured to receive notifications to the application software via a second communication device.

17. A method for controlling the output of multiple lighting fixtures, comprising the steps of:
providing a plurality of system compatible lighting fixtures, each including a first wireless communication device configured to receive control data structured to cause said plurality of system compatible lighting fixtures to output at least one of a plurality of lighting parameters;
providing a portable computing device including a processor and a second wireless communication device, said portable computing device storing lighting profiles for all system compatible lighting fixtures;
automatically detecting all first wireless communication devices of system compatible lighting fixtures in one step with the second wireless communication device, and automatically pairing all first wireless communication devices with the second wireless communication device without requiring a user to manually pair said second wireless communication device with said first wireless communication devices; and
automatically assigning system compatible lighting fixtures into at least one group of system compatible lighting fixtures, each system compatible lighting fixture of a group outputting the same at least one lighting parameter at the same time.

18. The method according to claim 17, wherein the first and second wireless communication devices are Bluetooth transceivers.

19. The method according to claim 17, further comprising the steps of:
interacting with a graphical user interface of the portable computing device to select the at least one lighting parameter to be output by the group.

20. The method according to claim 19, further comprising the steps of defining a program comprising a sequence of lighting parameters to be output by a first group and wirelessly communicating the program to the first group.

21. The method according to claim 20, further comprising the steps of:
defining a second program comprising a sequence of lighting parameters to be outputted by a second group and wirelessly communicating the second program to a second group, the program communicated to the first group being different than the program communicated to the second group; and
executing the first program and second program by the lighting fixtures of the respective first group and second group simultaneously.

22. A computer program product stored in a non-transitory computer readable storage medium, said computer program product having program instructions for executing the steps of the method according to claim 17, when the computer program is executed by a processor of a portable computing device.

23. A portable computing device for communicating control data to a plurality of system compatible lighting fixtures for producing at least one lighting effect, comprising:
a wireless communication device configured to communicate using the Bluetooth protocol;
application software executable by a processor of the portable computing device, said application software including lighting profiles for all system compatible lighting fixtures, said application software configured to automatically detect all of the plurality of system compatible lighting fixtures in one step and automatically connect the wireless communication device to all of the plurality of lighting fixtures without requiring a user to manually pair the wireless communication device with the plurality of system compatible lighting fixtures;
the application software configured to automatically assign each system compatible lighting fixture of the plurality of system compatible lighting fixtures into a group based on predetermined grouping criteria pre-programmed in the application software, wherein each lighting fixture of the group produces the same at least one lighting effect.

24. The portable computing device according to claim 23, further including a user interface, said application software generating a graphical user interface on the user interface, which is used to define at least one lighting parameter of each system compatible lighting fixture of a first group, a first sequence being communicated to the system compatible lighting fixtures of the first group by the wireless communication device.

25. The portable computing device according to claim 24, wherein said graphical user interface is used to define at least a second lighting parameter of a second group of system compatible lighting fixtures to be output by said second group of system compatible lighting fixtures simultaneously with the output of the at least one lighting parameter by the system compatible lighting fixtures of said first group, the at least a second parameter being communicated to the system compatible lighting fixtures of said second group by the wireless communication device.

* * * * *